US012764258B2

(12) United States Patent
Tsai

(10) Patent No.: US 12,764,258 B2
(45) Date of Patent: Oct. 13, 2026

(54) OPTICAL ENGINE MODULE AND PROJECTION DEVICE

(71) Applicant: Coretronic Corporation, Hsin-Chu (TW)

(72) Inventor: Te-Ying Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 294 days.

(21) Appl. No.: 18/536,023

(22) Filed: Dec. 11, 2023

(65) Prior Publication Data

US 2024/0223735 A1 Jul. 4, 2024

(30) Foreign Application Priority Data

Dec. 30, 2022 (CN) ......................... 202211721948.7

(51) Int. Cl.
*H04N 9/31* (2006.01)

(52) U.S. Cl.
CPC ......... *H04N 9/3144* (2013.01); *H04N 9/3197* (2013.01)

(58) Field of Classification Search
CPC .... H04N 9/315; H04N 9/3102; H04N 9/3105; H04N 9/3108; H04N 9/3123; H04N 9/3141; H04N 9/3144; H04N 9/3197; G03B 21/00; G03B 21/005; G03B 21/006; G03B 21/008; G03B 21/16; G03B 21/18; G03B 21/28; G03B 21/145; G03B 21/208
See application file for complete search history.

(56) References Cited

U.S. PATENT DOCUMENTS

| | | | | |
|---|---|---|---|---|
| 7,938,543 | B2 | 5/2011 | Gerets et al. | |
| 11,009,782 | B2 | 5/2021 | Yamashita | |
| 11,169,434 | B2 | 11/2021 | Tsai et al. | |
| 2006/0077353 | A1* | 4/2006 | Wu | G03B 21/12 353/52 |
| 2008/0198336 | A1* | 8/2008 | Chen | G03B 21/16 362/373 |
| 2016/0291449 | A1* | 10/2016 | Masuda | F21V 29/502 |
| 2017/0104965 | A1* | 4/2017 | Kadotani | G03B 21/142 |
| 2021/0157219 | A1* | 5/2021 | Mikutsu | G03B 21/28 |
| 2021/0203891 | A1* | 7/2021 | Kawase | G03B 21/2066 |
| 2021/0223671 | A1* | 7/2021 | Tsai | H04N 9/3144 |

FOREIGN PATENT DOCUMENTS

| | | |
|---|---|---|
| CN | 106054508 | 3/2018 |
| CN | 109690399 | 7/2021 |
| TW | 1559072 | 11/2016 |

* cited by examiner

*Primary Examiner* — Sultan Chowdhury
(74) *Attorney, Agent, or Firm* — JCIPRNET

(57) ABSTRACT

Disclosed are an optical engine module and a projection device. The optical engine module includes a housing, a prism component, a light valve, an air guiding channel, a first fan, and a first heat-dissipating module. The housing has a first opening and a second opening. The prism component is disposed in the housing. The light valve is disposed in the housing. The air guiding channel is disposed outside the housing and communicates with the first opening and the second opening of the housing. The first fan is disposed in the air guiding channel. The first heat-dissipating module includes a first heat-dissipating fin disposed in the air guiding channel, and a second heat-dissipating fin disposed outside the air guiding channel.

18 Claims, 10 Drawing Sheets

OPTICAL ENGINE MODULE AND PROJECTION DEVICE

CROSS-REFERENCE TO RELATED APPLICATION

This application claims the priority benefit of China application serial no. 202211721948.7, filed on Dec. 30, 2022. The entirety of the above-mentioned patent application is hereby incorporated by reference herein and made a part of this specification.

BACKGROUND OF THE DISCLOSURE

Field of the Disclosure

The present disclosure relates to an optical device, and in particular relates to an optical engine module and a projection device having the optical engine module.

Description of Related Art

A projection device converts an illumination beam from a total internal reflection prism (TIR Prism) into an image beam by using a light valve, and projects the image beam out of the projection device by using a projection lens. Energy loss occurs when the light beam passes through the TIR prism, which causes the TIR prism to heat up. Moreover, when it is "Off-State", the light valve diverts the light beam from the projection lens, and the light beam is reflected by the light valve into the optical engine cavity and converted into heat energy, thus causing the temperature inside the optical engine cavity to rise. In order to avoid overheating inside the optical engine cavity, other than dissipating heat through natural convection, a fan is also added in the optical engine cavity for forced convection. However, after the fan is added, the air flow generated by the fan will blow to the off-light heat sink in the optical engine cavity, and the heat of the off-light heat sink will be retained in the optical engine cavity. Therefore, the temperature in the optical engine cavity cannot be effectively reduced, which causes low picture quality of the projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The present disclosure provides an optical engine module, which may improve the heat dissipation effect inside a housing.

The present disclosure further provides a projection device, which includes the above-mentioned optical engine module, which may improve the heat dissipation effect inside the housing, thereby having better projection quality.

Other purposes and advantages of the present disclosure may be further understood from the technical features disclosed in the present disclosure.

In order to achieve one or part of or all of the above-mentioned purposes or other purposes, an embodiment of the present disclosure provides an optical engine module, which includes a housing, a prism component, a light valve, an air guiding channel, a first fan, and a first heat-dissipating module. The housing has a first opening and a second opening. The prism component is disposed in the housing. The light valve is disposed in the housing. The air guiding channel is disposed outside the housing and communicates with the first opening and the second opening of the housing. The first fan is disposed in the air guiding channel. The first heat-dissipating module includes a first heat-dissipating fin disposed in the air guiding channel, and a second heat-dissipating fin disposed outside the air guiding channel.

In an embodiment of the present disclosure, the above-mentioned air guiding channel includes a main channel and a first extending channel and a second extending channel connected to the main channel. The first fan and the first heat-dissipating fin are located in the main channel. The extending direction of the main channel is different from the extending direction of the first extending channel and the extending direction of the second extending channel.

In an embodiment of the present disclosure, the above-mentioned first extending channel is configured to guide the air flow from the main channel to the first opening of the housing. The second extending channel is configured to guide the air flow from the second opening of the housing to the main channel.

In an embodiment of the present disclosure, a cross-sectional area of the above-mentioned second extending channel gradually increases in a direction from the second opening to the main channel.

In an embodiment of the present disclosure, the air flow from the first fan flows through the first opening, the prism component, the second opening, the first heat-dissipating fin and the first fan in sequence to form a circulating air flow.

In an embodiment of the present disclosure, the first heat-dissipating module further includes a heat conduction element, and the heat conduction element is adaptable for connecting the first heat-dissipating fin and the second heat-dissipating fin.

In an embodiment of the present disclosure, the optical engine module further includes a second heat-dissipating module, and the second heat-dissipating module includes a heat-dissipating fin and a heat conduction structure connected to each other. The housing further includes a third opening, and the second heat-dissipating module is connected to the third opening. At least a portion of the heat conduction structure is located inside the housing, and the heat-dissipating fin is located outside the housing, the heat conduction structure is adapted to receive off light from the light valve.

In an embodiment of the present disclosure, the optical engine module further includes an air deflector disposed in the housing. The first end of the air deflector is connected to the first opening of the housing. The air deflector is configured for guiding the air flow from the first fan to the prism component.

In an embodiment of the present disclosure, the optical engine module further includes a baffle disposed in the housing, and connected to the second end of the air deflector. At least a portion of the baffle is located between the prism component and the heat conduction structure of the second heat-dissipating module.

In an embodiment of the present disclosure, the first heat-dissipating module and the second heat-dissipating module are respectively located on opposite sides of the housing.

In an embodiment of the present disclosure, the optical engine module further includes a second fan located at the second opening. The air flow from the first fan flows through the first opening, the prism component, the second fan located at the second opening, the first heat-dissipating fin and the first fan in sequence to form a circulating air flow.

In an embodiment of the present disclosure, the first fan includes a blower fan or an axial flow fan.

In order to achieve one or part or all of the above purposes or other purposes, an embodiment of the present disclosure provides a projection device including an illumination system, an optical engine module, and a projection lens. The illumination system is configured to provide an illumination beam. The optical engine module includes a housing, a prism component, a light valve, an air guiding channel, a first fan and a first heat-dissipating module. The housing has a first opening and a second opening. The prism component is disposed in the housing and is located on the transmission path of the illumination beam. The light valve is disposed in the housing and is adaptable for converting the illumination beam from the prism component into an image beam. The air guiding channel is disposed outside the housing and communicates with the first opening and the second opening of the housing. The first fan is disposed in the air guiding channel. The first heat-dissipating module includes a first heat-dissipating fin disposed in the air guiding channel, and a second heat-dissipating fin disposed outside the air guiding channel. The projection lens is disposed on the transmission path of the image beam, and is configured for projecting the image beam out of the projection device.

In an embodiment of the present disclosure, the optical engine module further includes a second heat-dissipating module, and the second heat-dissipating module includes a heat-dissipating fin and a heat conduction structure connected to each other. The housing further includes a third opening, and the second heat-dissipating module is connected to the third opening. At least a portion of the heat conduction structure is located inside the housing, and the heat-dissipating fin is located outside the housing, the heat conduction structure is adapted to receive off light from the light valve. The housing further includes a lens opening, and the projection lens is connected to the lens opening. The air guiding channel, the second heat-dissipating module, the projection lens and the housing define a sealed chamber.

In an embodiment of the present disclosure, the optical engine module further includes an air deflector disposed in the housing. The first end of the air deflector is connected to the first opening of the housing. The air deflector is configured for guiding the air flow from the first fan to the prism component.

In an embodiment of the present disclosure, the optical engine module further includes a baffle disposed in the housing, and connected to the second end of the air deflector. At least a portion of the baffle is located between the prism component and the heat conduction structure of the second heat-dissipating module.

In an embodiment of the present disclosure, the above-mentioned air guiding channel includes a main channel and a first extending channel and a second extending channel connected to the main channel. The first fan and the first heat-dissipating fin are located in the main channel. The extending direction of the main channel is different from the extending direction of the first extending channel and the extending direction of the second extending channel.

In an embodiment of the present disclosure, a cross-sectional area of the above-mentioned second extending channel gradually increases from the second opening to the direction of the main channel.

In an embodiment of the present disclosure, the air flow from the first fan flows through the first opening, the prism component, the second opening, the first heat-dissipating fin and the first fan in sequence to form a circulating air flow.

In an embodiment of the present disclosure, the optical engine module further includes a second fan located at the second opening. The air flow from the first fan flows through the first opening, the prism component, the second fan located at the second opening, the first heat-dissipating fin and the first fan in sequence to form a circulating air flow.

Based on the above, the embodiments of the present disclosure at least have one of the following advantages or effects. In the optical engine module of the present disclosure, the air guiding channel disposed outside the housing communicates with the first opening and the second opening of the housing, and the air flow of the first fan disposed in the air guiding channel may flow through the first opening, the prism component, the second opening, the first heat-dissipating fin and the first fan in sequence to form a circulating air flow. In this way, it is possible to effectively reduce the temperature of the air inside the housing, so as to effectively improve the heat dissipation effect inside the housing. In addition, the projection device using the optical engine module of the present disclosure may have better projection quality.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
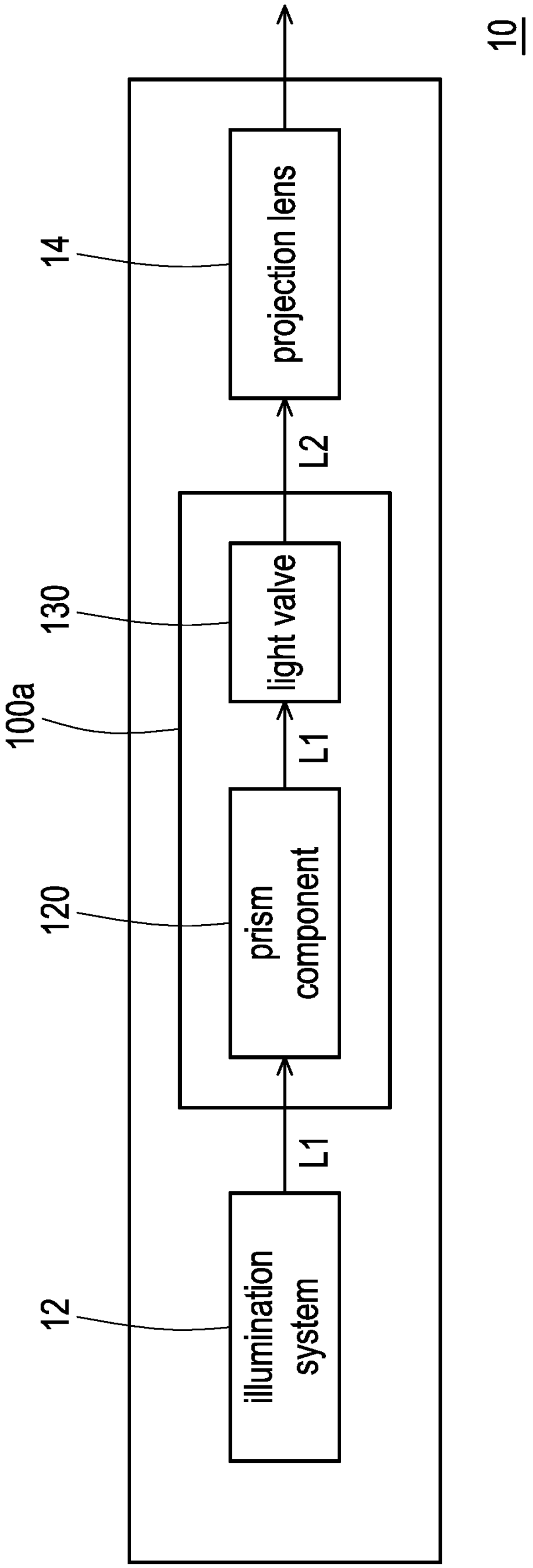
FIG. 1 is a schematic view of a projection device according to an embodiment of the present disclosure.

FIG. 1 is a schematic view of a projection device according to an embodiment of the present disclosure. Please refer to FIG. 1, in this embodiment, a projection device 10 includes an illumination system 12, an optical engine module 100*a* and a projection lens 14. The optical engine module 100*a* includes a prism component 120 and a light valve 130. The illumination system 12 is configured to provide an illumination beam L1. The prism component 120 of the optical engine module 100*a* is located on the transmission path of the illumination beam L1, and the light valve 130 of the optical engine module 100*a* is adapted to convert the illumination beam L1 from the prism component 120 into an image beam L2. The projection lens 14 is disposed on the transmission path of the image beam L2 for projecting the image beam L2 out of the projection device 10. More specifically, the prism component 120 of the optical engine module 100*a* is also located on the transmission path of the image beam L2 from the light valve 130, and the projection lens 14 is disposed on the transmission path of the image beam L2 from the prism component 120.

In this embodiment, the illumination system 12 includes an excitation light source. The excitation light source is, for example, light emitting diodes (LED) and laser diodes (LD). The illumination system 12 may further include a wavelength conversion element, a homogenization element, a filter element, and at least one light guiding element, etc. The illumination system 12 is configured to provide light beams of different wavelengths as a source of the illumination beam L1. Specifically, any light source that meets the volume requirement in actual design may be adopted for implementation, and the present disclosure provides no specific limitation to the type or form of the illumination system 12. The prism component 120 is, for example, a total internal reflection prism (TIR Prism). The incident light (i.e., the illumination beam L1) may be totally reflected to the light valve 130 by utilizing the air layer in the TIR prism. When it is "On-State", the light valve 130 reflects the incident light to the projection lens 14, and the projection lens 14 projects the image beam L2 out of the projection device 10. When it is "Off-State", the light valve 130 diverts the incident light from the projection lens 14, and the incident light will be reflected into the optical engine module 100*a* and converted into heat energy.

The light valve 130 is, for example, a reflective light modulator such as a liquid crystal on silicon panel (LCoS panel) or a digital micro-mirror device (DMD). In an embodiment, the light valve 130 is, for example, a transparent liquid crystal panel, an electro-optical modulator, a magneto-optic modulator, an acousto-optic modulator (AOM) and other transmissive optical modulators, but this embodiment provides no limitation to the type and form of the light valve 130. The detailed steps and implementation of the method for the light valve 130 to modulate the illumination beam L1 into the image beam L2 may be sufficiently derived from the teaching, suggestion and implementation of the general knowledge in the technical field, and the details are not repeated herein. In addition, the projection lens 14 includes, for example, a combination of one or more optical lenses with diopters, such as various combinations of non-planar lenses such as biconcave lenses, biconvex lenses, concave-convex lenses, convex-concave lenses, plano-convex lenses, and plano-concave lenses. In an embodiment, the projection lens 14 may also include a planar optical lens to project the image beam from the light valve 130 out of the projection device 10 in a reflection or transmission manner to form a projection beam. Herein, the present embodiment provides no limitation to the type and form of the projection lens 14.

Figure 2:
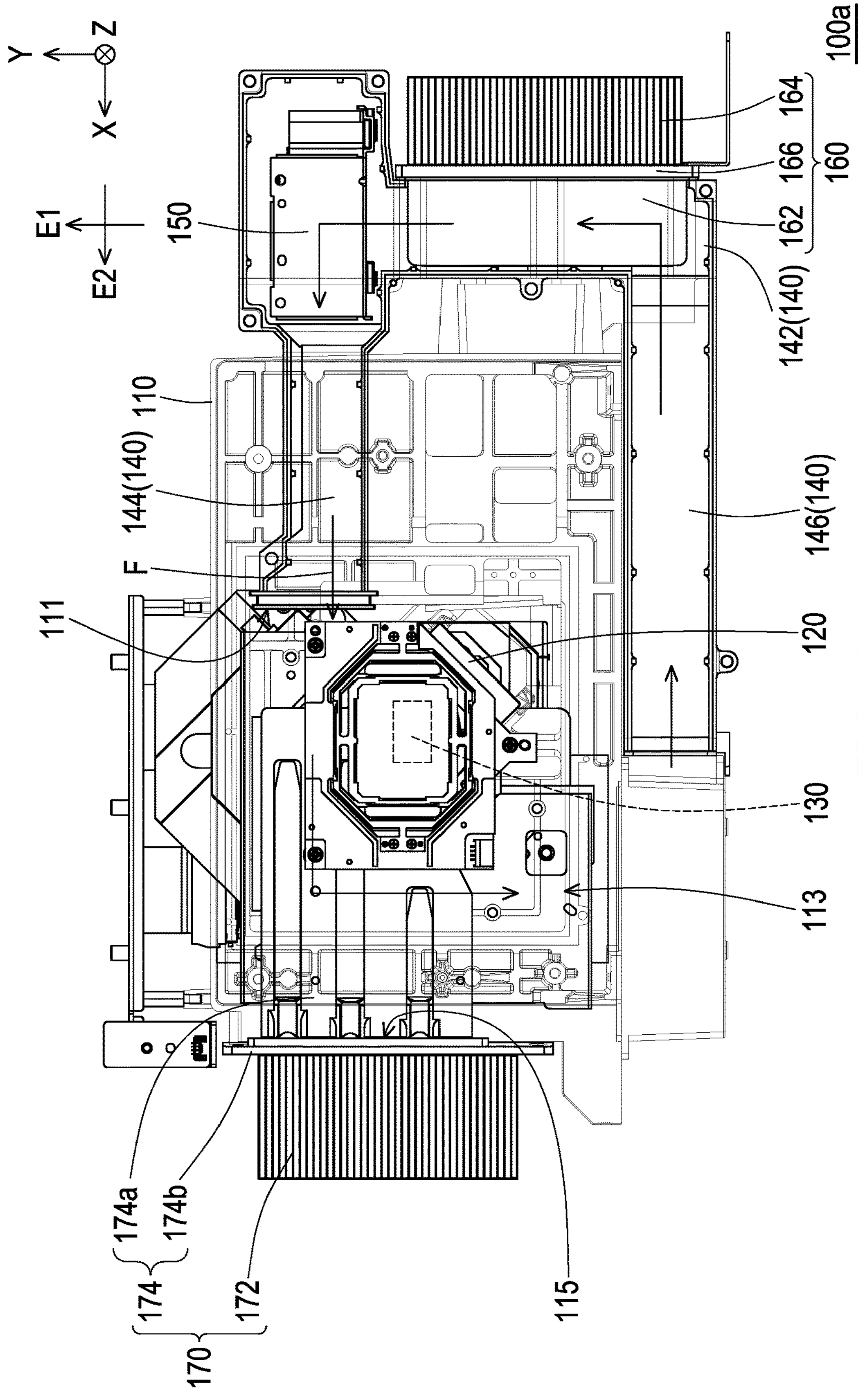
FIG. 2 is a schematic top view of the optical engine module of FIG. 1.
Figure 3:
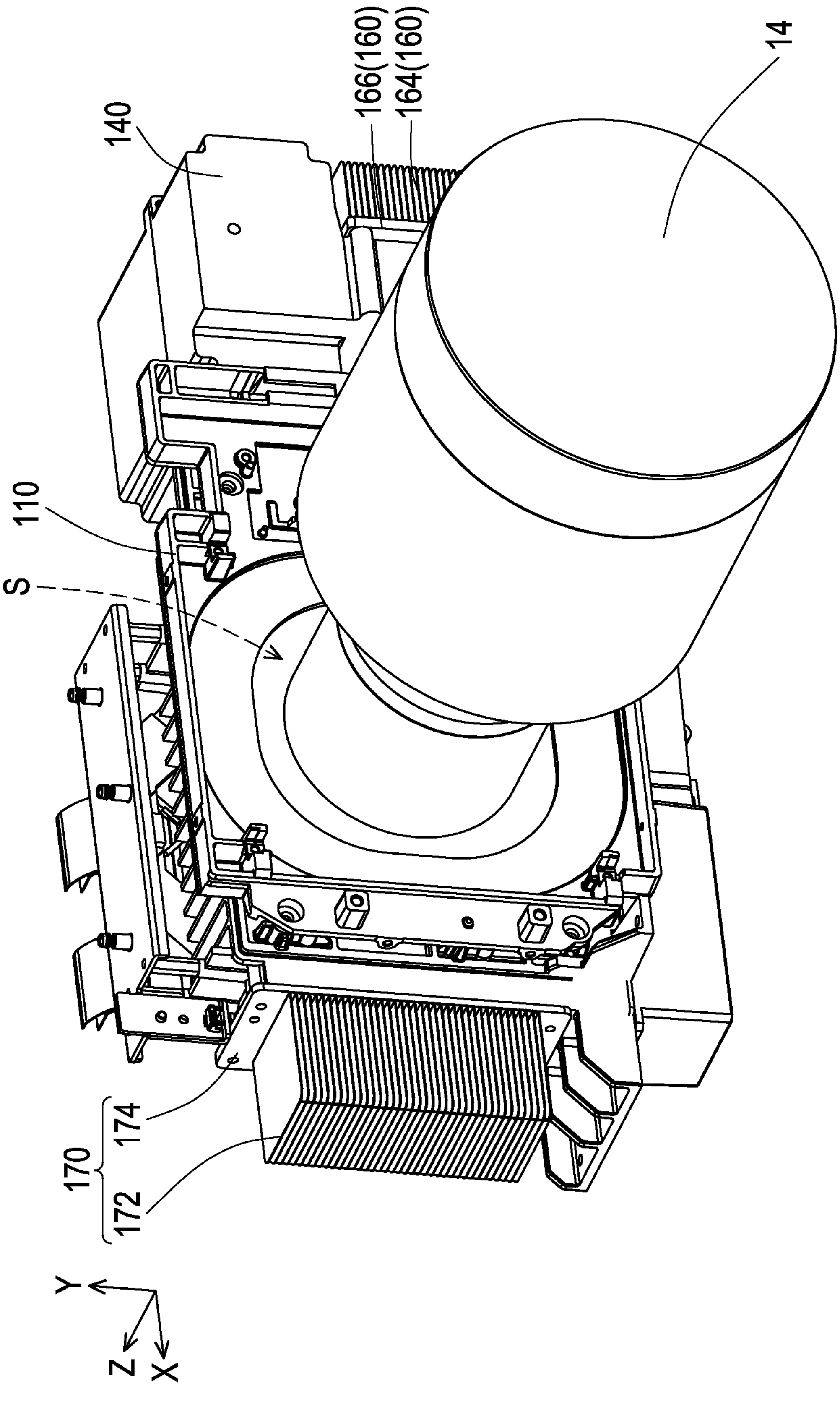
FIG. 3 is a perspective view of the optical engine module and a projection lens of FIG. 1.
Figure 4:
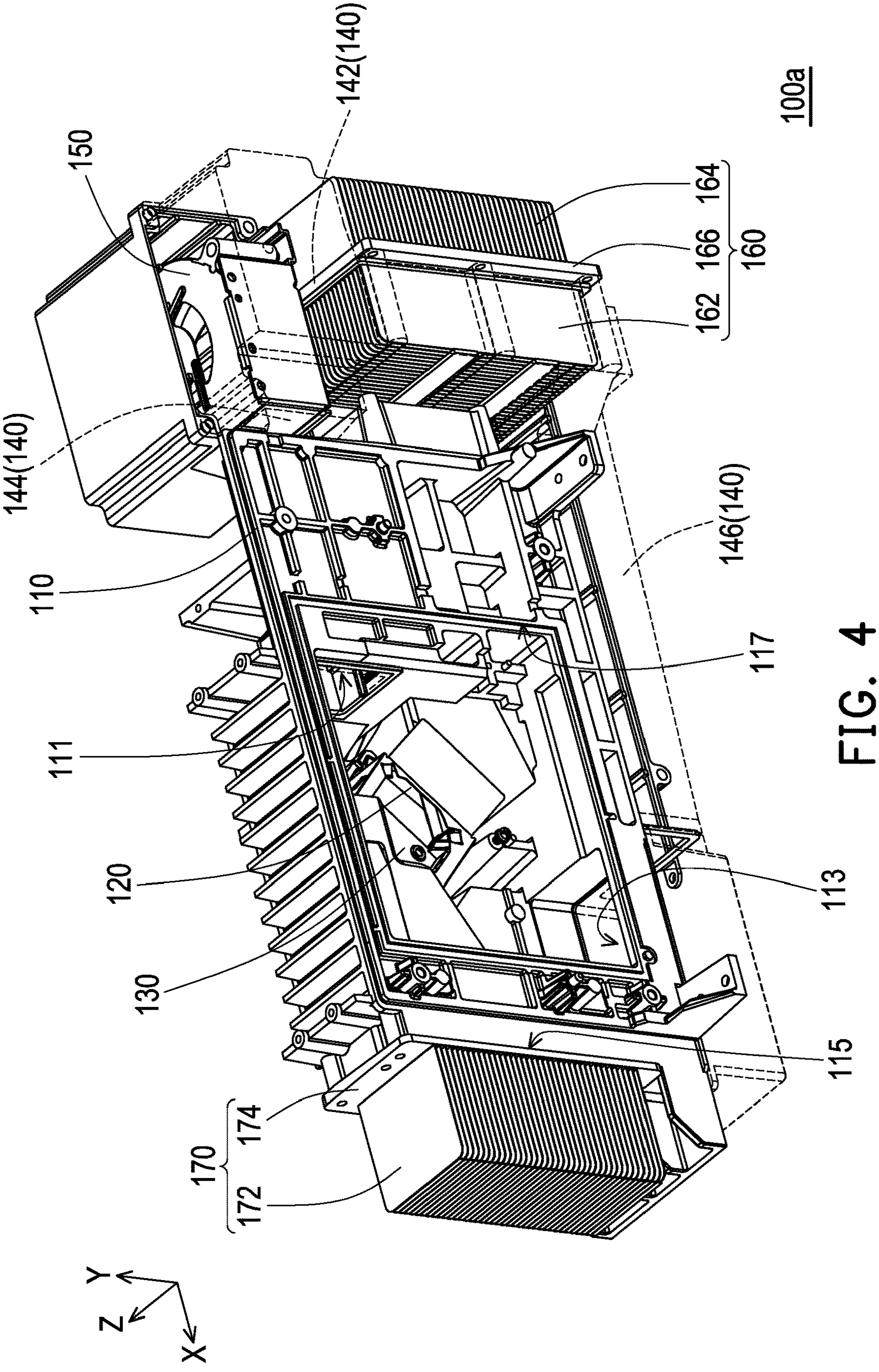
FIG. 4 is a perspective view of the optical engine module of FIG. 3.
Figure 5:
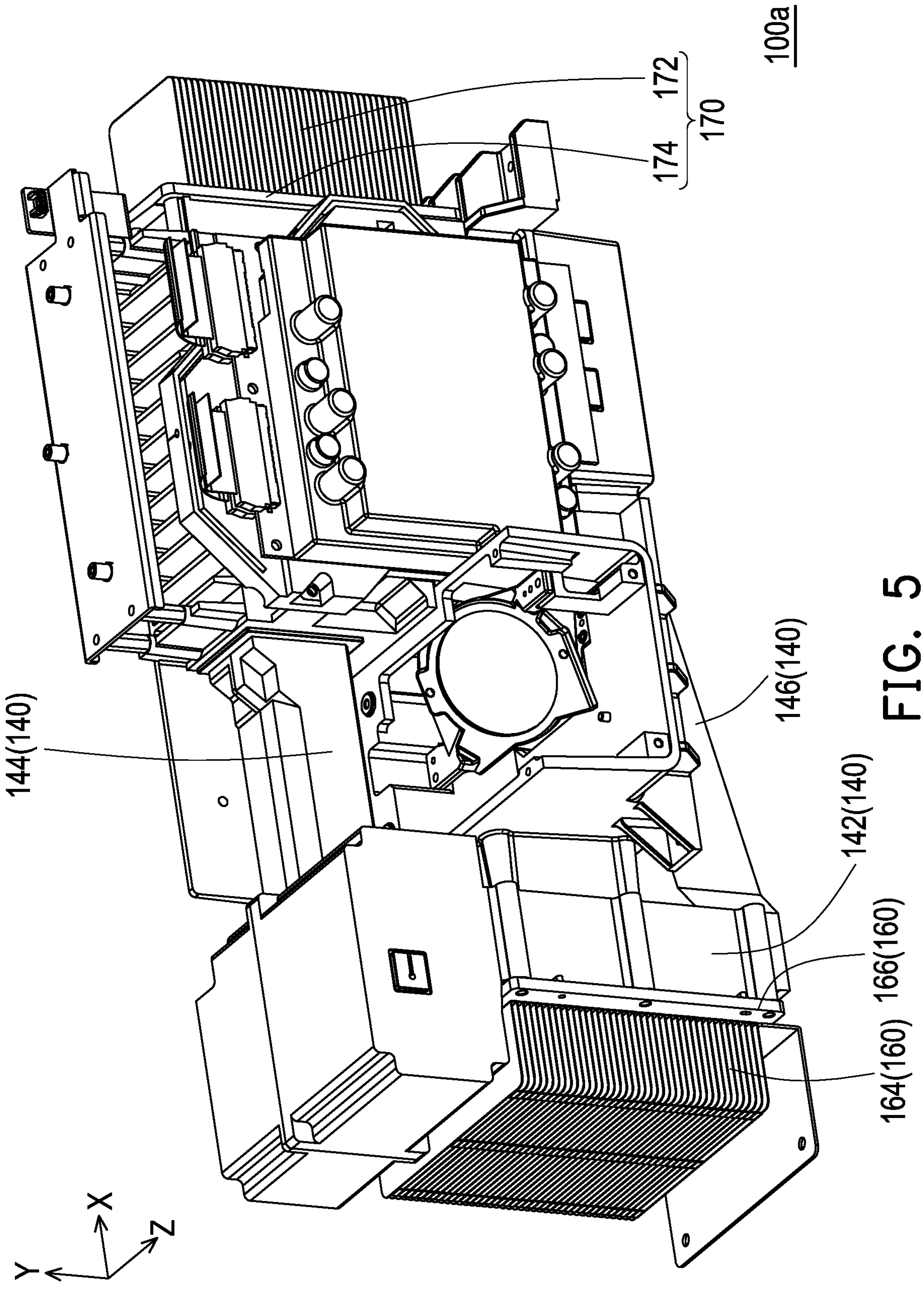
FIG. 5 is a perspective view of the rear side of the optical engine module of FIG. 4.
Figure 6:
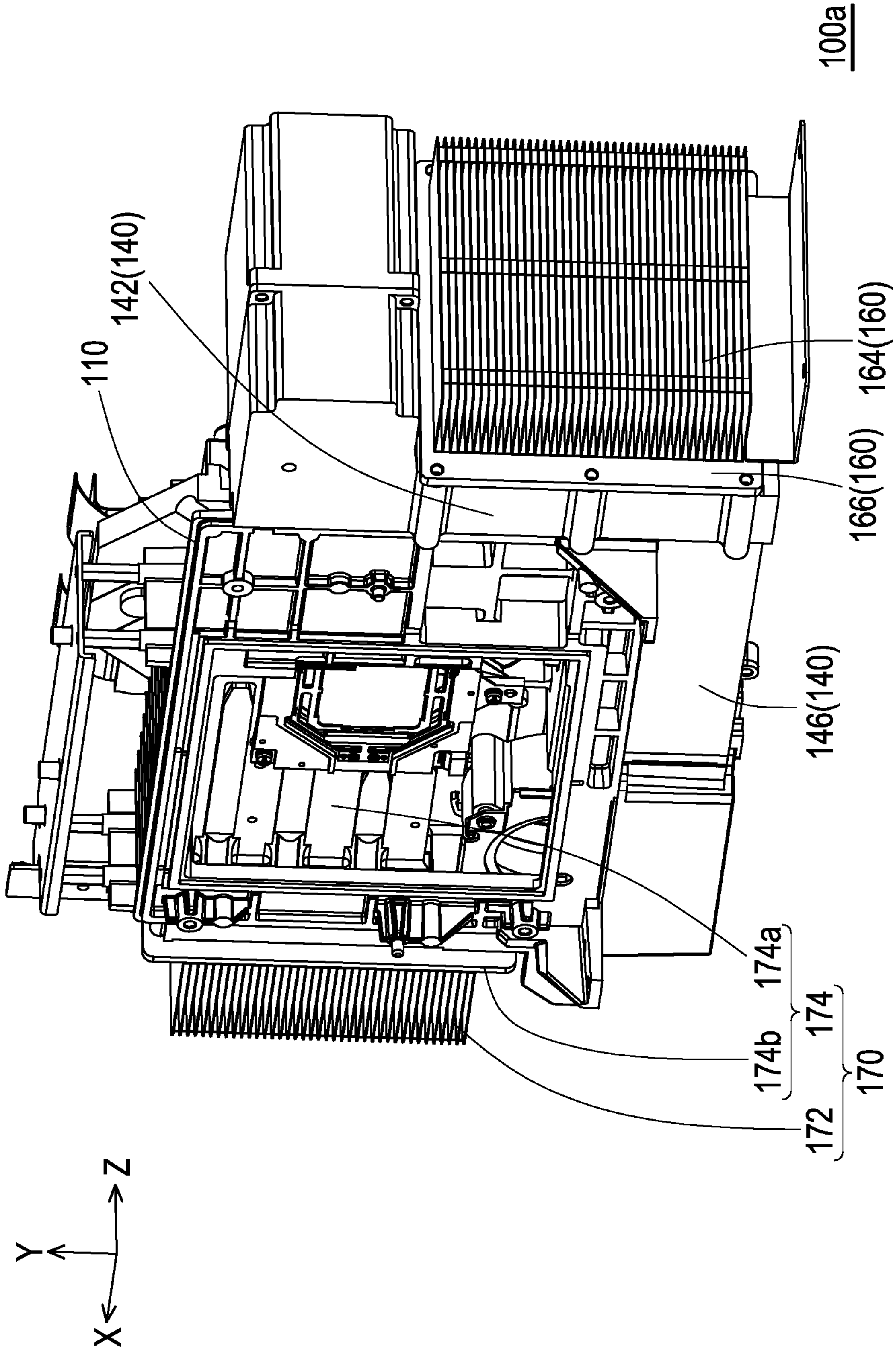
FIG. 6 is a perspective view of the optical engine module of FIG. 4 at another viewing angle.
Figure 7:
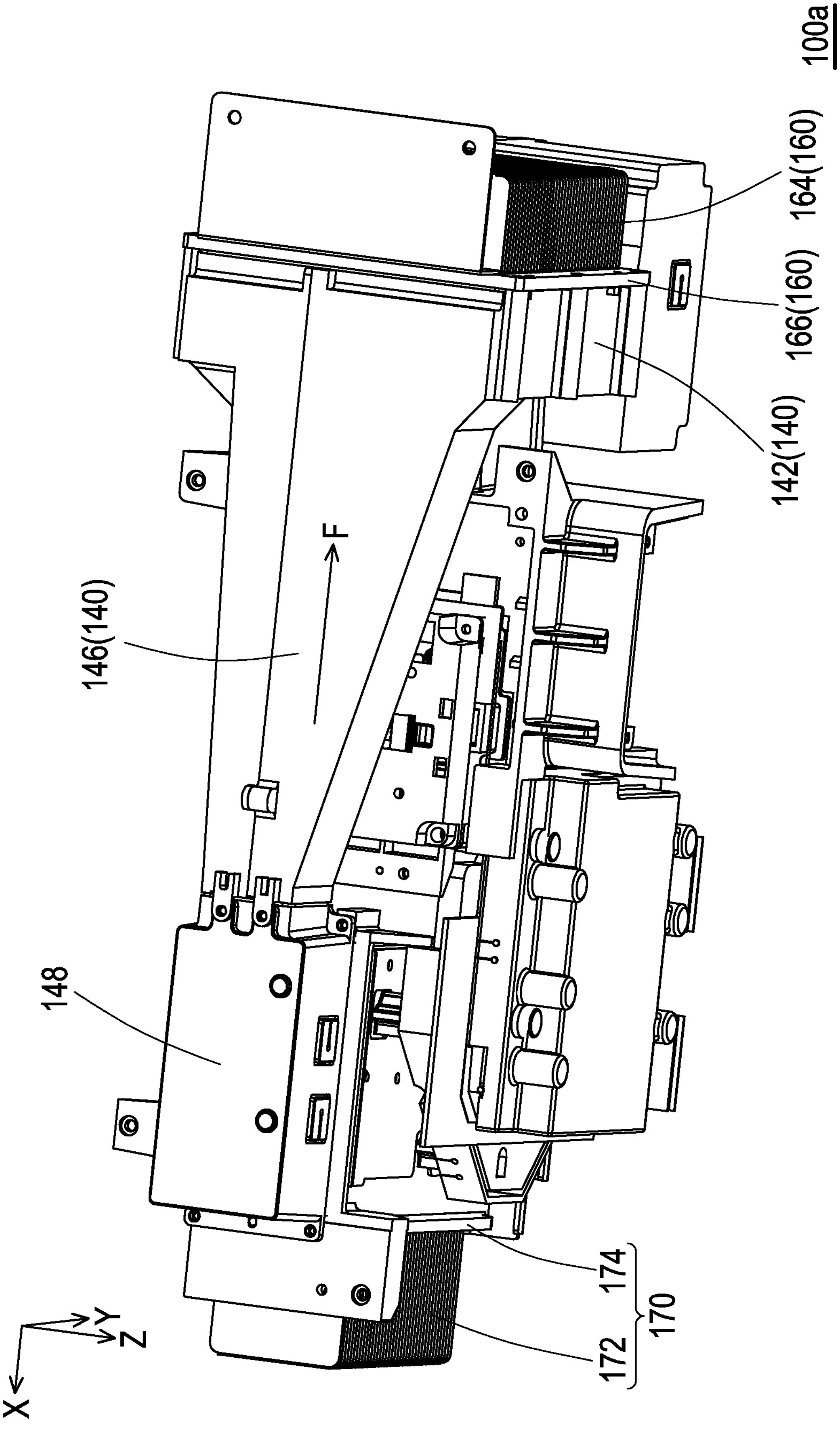
FIG. 7 is a bottom perspective view of the optical engine module of FIG. 4.

FIG. 2 is a schematic top view of the optical engine module of FIG. 1. FIG. 3 is a perspective view of the optical engine module and a projection lens of FIG. 1. FIG. 4 is a perspective view of the optical engine module of FIG. 3. FIG. 5 is a perspective view of the rear side of the optical engine module of FIG. 4. FIG. 6 is a perspective view of the optical engine module of FIG. 4 at another viewing angle. FIG. 7 is a bottom perspective view of the optical engine module of FIG. 4. For the convenience of description, the air guiding channel 140 in FIG. 4 is shown in a partial perspective view.

Please refer to FIG. 2, FIG. 3 and FIG. 4 at the same time. In this embodiment, the optical engine module 100*a* includes a housing 110, a prism component 120, a light valve 130, an air guiding channel 140, a first fan 150 and a first heat-dissipating module 160. The housing 110 has a first opening 111 and a second opening 113. The prism component 120 and the light valve 130 are disposed in the housing 110, and the prism component 120 is disposed corresponding to the light valve 130. The air guiding channel 140 is disposed outside the housing 110 and communicates with the first opening 111 and the second opening 113 of the housing 110. The first fan 150 is disposed in the air guiding channel 140. The first heat-dissipating module 160 includes a first heat-dissipating fin 162 disposed inside the air guiding channel 140, and a second heat-dissipating fin 164 disposed outside the air guiding channel 140. The air flow F from the first fan 150 flows through the first opening 111, the prism component 120, the second opening 113, the first heat-dissipating fin 162 and the first fan 150 in sequence to form a circulating air flow. Here, the first opening 111 of the housing 110 may be regarded as an air inlet, and the second opening 113 of the housing 110 may be regarded as an air outlet. It should be noted that the difference between FIG. 2 and FIG. 4 is that the actuator of the optical engine module 100*a* is shown in FIG. 2. Viewed along the direction Z, the light valve 130 is disposed below the actuator, therefore, the light valve 130 in FIG. 2 is indicated by a dashed line.

In detail, please refer to FIG. 2, FIG. 4, FIG. 5 and FIG. 6 at the same time. The air guiding channel 140 of this embodiment includes a main channel 142 and a first extending channel 144 and a second extending channel 146 connected to the main channel 142. The first fan 150 and the first heat-dissipating fin 162 are located in the main channel 142. The first fan 150 is, for example, a blower fan or an axial flow fan. Here, the extending direction E1 of the main channel 142 is different from the extending direction E2 of the first extending channel 144 and the extending direction E2 of the second extending channel 146. In an embodiment, the extending direction E1 is perpendicular to the extending direction E2. The first extending channel 144 is connected with the first opening 111 of the housing 110. The first extending channel 144 is configured to guide the air flow F from the main channel 142 to the first opening 111 of the housing 110. The second extending channel 146 is configured to guide the air flow F from the second opening 113 of the housing 110 to the main channel 142. More specifically, the air guiding channel 140 further includes a connecting portion 148 (shown in FIG. 7), which is located between the second extending channel 146 and the second opening 113 of the housing 110. The connecting portion 148 has two openings, and the two openings of the connecting portion 148 respectively connect the second extending channel 146 and the second opening 113 of the casing 110. Please refer to FIG. 4 and FIG. 7 at the same time. The cross-sectional area of the second extending channel 146 gradually increases in a direction from the second opening 113 to the main channel 142, so that the air flow F is blown to a large area of the first heat-dissipating module 160, thereby increasing heat exchange efficiency. In another embodiment, the second extending channel 146 of the air guiding channel 140 is directly connected to the second opening 113 of the housing 110. The first heat-dissipating module 160 of this embodiment further includes a heat conduction element 166, and the heat conduction element 166 is adaptable for connecting the first heat-dissipating fin 162 and the second heat-dissipating fin 164. Here, the heat conduction element 166 is, for example, a metal base or a heat pipe, and the heat in the air guiding channel 140 may be transmitted to the outside of the air guiding channel 140 through the first heat-dissipating module 160.

Furthermore, the optical engine module 100*a* of this embodiment further includes a second heat-dissipating module 170, and the second heat-dissipating module 170 includes a heat heat-dissipating fin 172 and a heat conduction structure 174 connected to each other. The housing 110 of this embodiment further includes a third opening 115, and the second heat-dissipating module 170 is connected to the third opening 115. At least a portion of the heat conduction structure 174 is located in the housing 110, and the heat conduction structure 174 is adapted to receive the off light from the light valve 130. In this embodiment, a portion 174*a* of the heat conduction structure 174 is located inside the housing 110, and another portion 174*b* of the heat conduction structure 174 is located outside the housing 110. A portion 174*a* of the heat conduction structure 174 extends from the third opening 115 into the housing 110 to a position of the prism component 120 corresponding to the light valve 130 in the "Off-State". A portion 174*a* of the heat conduction structure 174 located in the housing 110 is adapted to receive the off light from the light valve 130. In other words, the portion 174*a* of the heat conduction structure 174 may be regarded as a heated end, and the temperature of the heated end is much higher than that of the prism component 120. The other part 174*b* of the heat conduction structure 174 and the heat-dissipating fin 172 are located outside the housing 110, and the external air flow may dissipate heat from the heat-dissipating fin 172. Here, the first heat-dissipating module 160 and the second heat-dissipating module 170 are respectively located on opposite sides of the housing 110, thereby obtaining external air flow with lower temperature for high-efficiency heat exchange, and the so-called external air flow refers to the air flow outside the housing 110, such as the air flow from within the housing of the projection device 10 but generated by a fan located outside the housing 110 of the optical engine module 100*a*.

In addition, please refer to FIG. 3 and FIG. 4 at the same time, the housing 110 of this embodiment further includes a lens opening 117, and the projection lens 14 is connected to the lens opening 117. The air guiding channel 140, the second heat-dissipating module 170, the projection lens 14 and the housing 110 define a sealed chamber S for preventing dust from entering and maintaining a good image quality.

Figure 8:
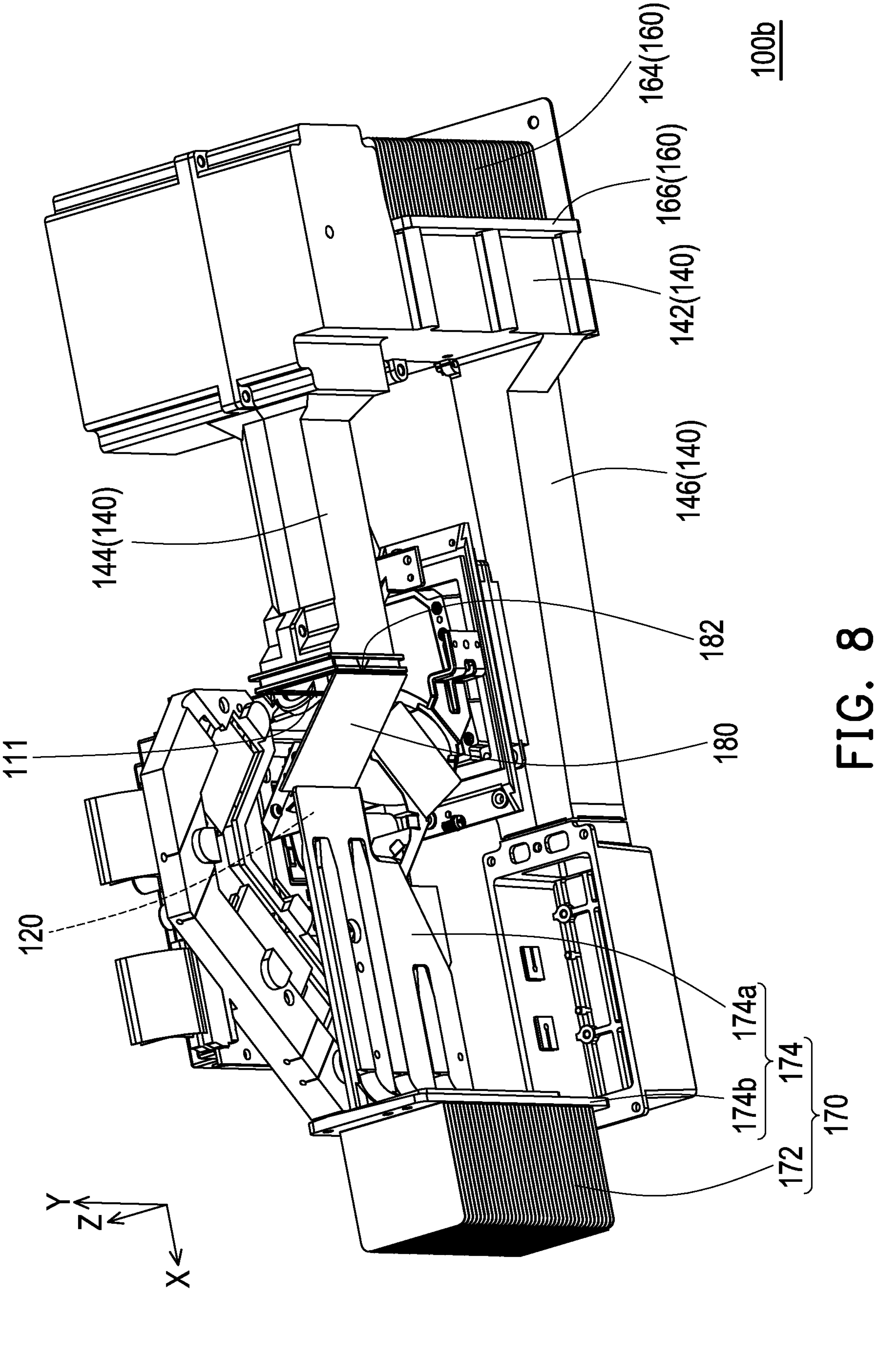
FIG. 8 is a schematic perspective view of an optical engine module according to another embodiment of the present disclosure.
Figure 9:
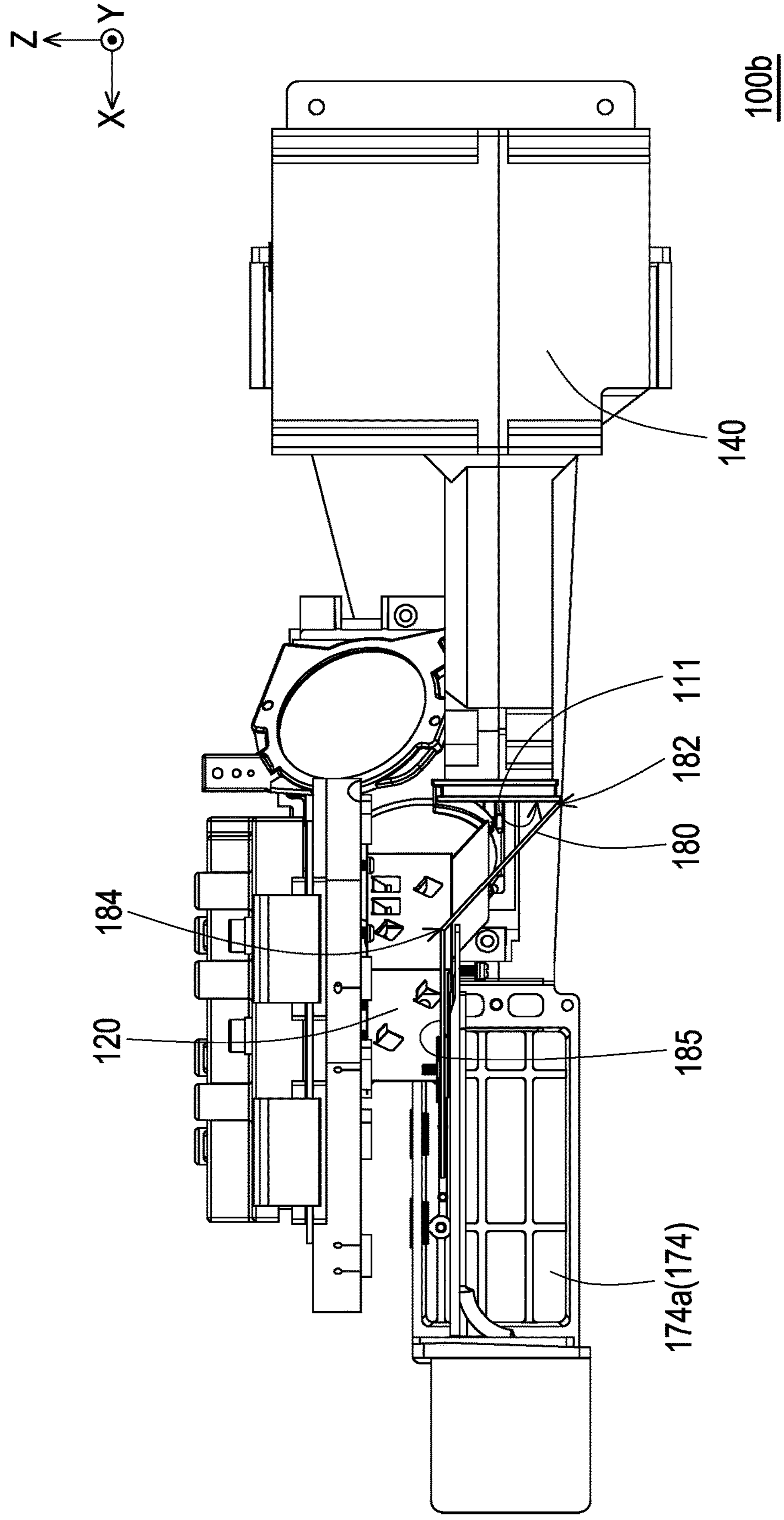
FIG. 9 is a top perspective view of FIG. 8.

Please refer to FIG. 4, FIG. 8 and FIG. 9 at the same time. FIG. 8 is a schematic perspective view of an optical engine module according to another embodiment of the present disclosure. FIG. 9 is a top perspective view of FIG. 8. The optical engine module 100*b* of this embodiment is similar to the optical engine module 100*a* of FIG. 4, but the main difference between the two is that: the optical engine module 100*b* of this embodiment may further include an air deflector 180, and the air deflector 180 is configured inside the housing 110, and the first end 182 of the air deflector 180 is connected to the first opening 111 of the housing 110. Since the off light from the light valve 130 will be transmitted to a portion 174*a* of the heat conduction structure 174 through the prism component 120, that is, the prism component 120 is located between the portion 174*a* of the heat conduction structure 174 and the light valve 130. However, since the air flow F entering the housing 110 from the first opening 111 is not blown directly against the prism component 120, the heat dissipation effect of the prism component 120 is not optimal. Therefore, the air deflector 180 is configured to guide the air flow F of the first fan 150 to the prism component 120, which means that the air flow F from the first fan 150 may directly flow through the prism component 120 for heat dissipation, thereby improving the heat dissipation effect on the prism component 120.

In addition, the optical engine module 100*b* of this embodiment may further include a baffle 185 (shown in FIG. 9), which is disposed in the housing 110 and connected to the second end 184 of the air deflector 180, and at least a portion of the baffle 185 is located between the prism component 120 and the heat conduction structure 174 of the second heat-dissipating module 170. In this way, the air flow F will not flow through the heat conduction structure 174 of the second heat-dissipating module 170, so as to reduce retention of heat generated by off light inside the housing 110. The air flow F from the first fan 150 only dissipates heat from the prism component 120 and the lens of the projection lens 14, so that it is possible to improve the heat dissipation efficiency on the prism component 120 and the lens of the projection lens 14.

In the optical engine module 100*b* of this embodiment, the air guiding channel 140 arranged outside the housing 110 communicates with the first opening 111 and the second opening 113 of the housing 110, and the air flow F generated by the first fan 150 disposed in the air guiding channel 140 may flow through the first opening 111, the prism component 120, the heat conduction structure 174, the second opening 113, the first heat-dissipating fin 162 and the first fan 150 in sequence to form a circulating air flow. In this way, the low-temperature air flow F is first blown to the prism component 120 to cool the prism component 120, and then blown to the part 174*a* (i.e., the heat receiving end) of the heat conduction structure 174 of the second heat-dissipating module 170 with a higher temperature. It is possible to effectively reduce the temperature of the air inside the housing 110, thereby reducing the temperature of the lens of the projection lens 14 inside the housing 110 and the temperature of the prism component 120. In short, this embodiment is able to simultaneously cool down the temperature of the lens of the projection lens 14 inside the housing 110 and the temperature of the prism component 120, and achieve a dustproof effect on the optical engine module 100*b*.

Figure 10:
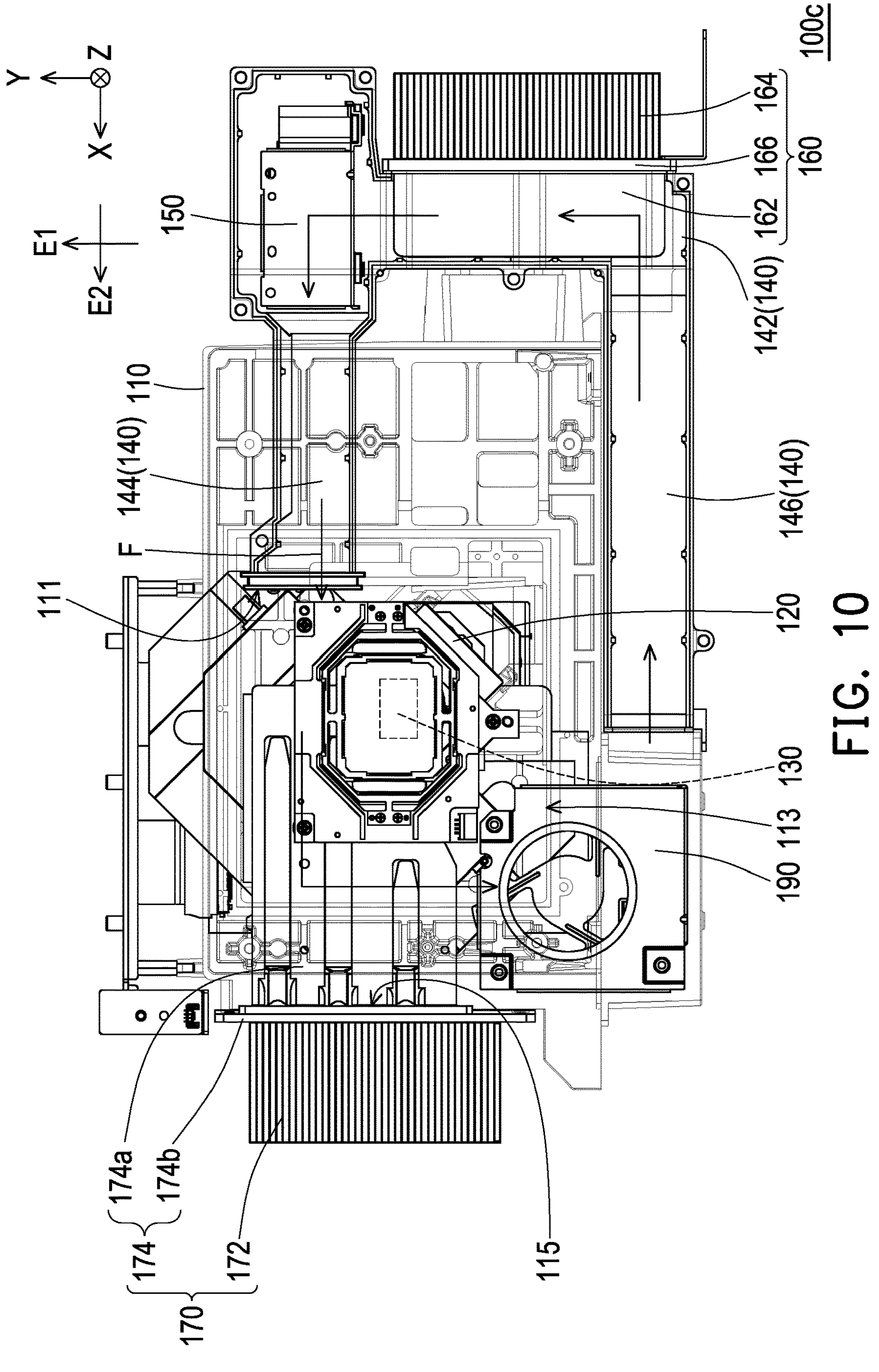
FIG. 10 is a schematic top view of an optical engine module according to still another embodiment of the present disclosure.

FIG. 10 is a schematic top view of an optical engine module according to still another embodiment of the present disclosure. Please refer to FIG. 2 and FIG. 10 at the same time. The projection device 100*c* of this embodiment is similar to the projection device 100*a* in FIG. 2, and the main difference between the two lies in that, in the present embodiment, the optical engine module 100*c* further includes a second fan 190 located at the second opening 113. More specifically, on a reference plane parallel to the XY plane, the orthographic projection of a portion of the second fan 190 on the reference plane overlaps with the orthographic projection of the housing 110 on the reference plane. The orthographic projection of another part of the second fan 190 on the reference plane overlaps with the orthographic projection of the air guiding channel 140 on the reference plane. The air flow F of the first fan 150 flows through the first opening 111, the prism component 120, the second fan 190 located at the second opening 113, the first heat-dissipating fin 162 and the first fan 150 in sequence to form a circulating air flow. In short, in this embodiment, the first fan 150 and the second fan 190 are adopted to connect the flow field in series, thereby increasing the air volume in the air guiding channel 140, thereby increasing the heat exchange efficiency. Here, the second fan 190 is, for example, a blower fan or an axial flow fan.

To sum up, the embodiments of the present disclosure at least have one of the following advantages or effects. In the optical engine module of the present disclosure, the air guiding channel disposed outside the housing communicates with the first opening and the second opening of the housing, and the air flow of the first fan disposed in the air guiding channel may flow through the first opening, the prism component, the second opening, the first heat-dissipating fin and the first fan in sequence to form a circulating air flow. In this way, it is possible to effectively reduce the temperature of the air inside the housing, so as to effectively improve the heat dissipation effect inside the housing. In addition, the projection device using the optical engine module of the present disclosure may have better projection quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An optical engine module, comprising:

a housing, having a first opening and a second opening;

a prism component, disposed in the housing;

a light valve, disposed in the housing;

an air guiding channel, disposed outside the housing and communicating with the first opening and the second opening of the housing, wherein the air guiding channel comprises a main channel, a first extending channel and a second extending channel, the first extending channel and the second extending channel are respectively connected to the main channel, and an extending direction of the main channel is different from an extending direction of the first extending channel and an extending direction of the second extending channel;

a first fan, disposed in the main channel of the air guiding channel; and a first heat-dissipating module, comprising a first heat-dissipating fin disposed in the main channel of the air guiding channel, and a second heat-dissipating fin disposed outside the air guiding channel.

2. The optical engine module according to claim 1, wherein the first extending channel is configured to guide an air flow from the main channel to the first opening of the housing, the second extending channel is configured to guide the air flow from the second opening of the housing to the main channel.

3. The optical engine module according to claim 1, wherein a cross-sectional area of the second extending channel gradually increases in a direction from the second opening to the main channel.

4. The optical engine module according to claim 1, wherein an air flow from the first fan flows through the first opening, the prism component, the second opening, the first heat-dissipating fin and the first fan in sequence to form a circulating air flow.

5. The optical engine module according to claim 1, further comprising:

a second heat-dissipating module, comprising a heat-dissipating fin and a heat conduction structure connected to each other, wherein the housing further comprises a third opening, and the second heat-dissipating module is connected to the third opening, at least a portion of the heat conduction structure is located inside the housing, and the heat-dissipating fin is located outside the housing, wherein the heat conduction structure is adapted to receive off light from the light valve.

6. The optical engine module according to claim 5, further comprising:

an air deflector, disposed in the housing, wherein a first end of the air deflector is connected to the first opening of the housing, the air deflector is configured to guide an air flow from the first fan to the prism component.

7. The optical engine module according to claim 6, further comprising:

a baffle, disposed in the housing, and connected to a second end of the air deflector, wherein at least a portion of the baffle is located between the prism component and the heat conduction structure of the second heat-dissipating module.

8. The optical engine module according to claim 5, wherein the first heat-dissipating module and the second heat-dissipating module are located on opposite sides of the housing.

9. The optical engine module according to claim 1, further comprising:

a second fan, located at the second opening, wherein an air flow from the first fan flows through the first opening, the prism component, the second fan located at the second opening, the first heat-dissipating fin and the first fan in sequence to form a circulating air flow.

10. The optical engine module according to claim 1, wherein the first fan comprises a blower fan or an axial flow fan.

11. An optical engine module, comprising:

a housing, having a first opening and a second opening;

a prism component, disposed in the housing;

a light valve, disposed in the housing;

an air guiding channel, disposed outside the housing and communicating with the first opening and the second opening of the housing;

a first fan, disposed in the air guiding channel; and a first heat-dissipating module, comprising a first heat-dissipating fin disposed in the air guiding channel, and a second heat-dissipating fin disposed outside the air guiding channel, and a heat conduction element thermally coupling, the first heat-dissipating fin and the second heat-dissipating fin.

12. A projection device, comprising:

an illumination system, configured to provide an illumination beam;

an optical engine module, comprising:

a housing, having a first opening and a second opening;

a prism component, disposed in the housing and located on a transmission path of the illumination beam;

a light valve, disposed in the housing and adaptable for converting the illumination beam from the prism component into an image beam;

an air guiding channel, disposed outside the housing and communicating with the first opening and the second opening of the housing, wherein the air guiding channel comprises a main channel, a first extending channel and a second extending channel, the first extending channel and the second extending channel are respectively connected to the main channel, and an extending direction of the main channel is different from an extending direction of the first extending channel and an extending direction of the second extending channel;

a first fan, disposed in the main channel of the air guiding channel; and a first heat-dissipating module, comprising a first heat-dissipating fin disposed in the main channel of the air guiding channel, and a second heat-dissipating fin disposed outside the air guiding channel; and a projection lens, disposed on a transmission path of the image beam, and configured to project the image beam out of the projection device.

13. The projection device according to claim 12, wherein the optical engine module further comprises:

a second heat-dissipating module, comprising a heat-dissipating fin and a heat conduction structure connected to each other, wherein the housing further comprises a third opening, and the second heat-dissipating module is connected to the third opening, at least a portion of the heat conduction structure is located inside the housing, and the heat-dissipating fin is located outside the housing, wherein the heat conduction structure is adapted to receive off light from the light valve, and the housing further comprises a lens opening, and the projection lens is connected to the lens opening, and the air guiding channel, the second heat-dissipating module, the projection lens and the housing define a sealed chamber.

14. The projection device according to claim 13, wherein the optical engine module further comprises:

an air deflector, disposed in the housing, wherein a first end of the air deflector is connected to the first opening of the housing, the air deflector is configured to guide an air flow from the first fan to the prism component.

15. The projection device according to claim 14, wherein the optical engine module further comprises:

a baffle, disposed in the housing, and connected to a second end of the air deflector, wherein at least a portion of the baffle is located between the prism component and the heat conduction structure of the second heat-dissipating module.

16. The projection device according to claim 12, wherein a cross-sectional area of the second extending channel gradually increases in a direction from the second opening to the main channel.

17. The projection device according to claim 12, wherein an air flow from the first fan flows through the first opening, the prism component, the second opening, the first heat-dissipating fin and the first fan in sequence to form a circulating air flow.

18. The projection device according to claim 12, wherein the optical engine module further comprises:

a second fan, located at the second opening, wherein an air flow from the first fan flows through the first opening, the prism component, the second fan located at the second opening, the first heat-dissipating fin and the first fan in sequence to form a circulating air flow.

* * * * *